United States Patent Office 3,314,491
Patented Apr. 18, 1967

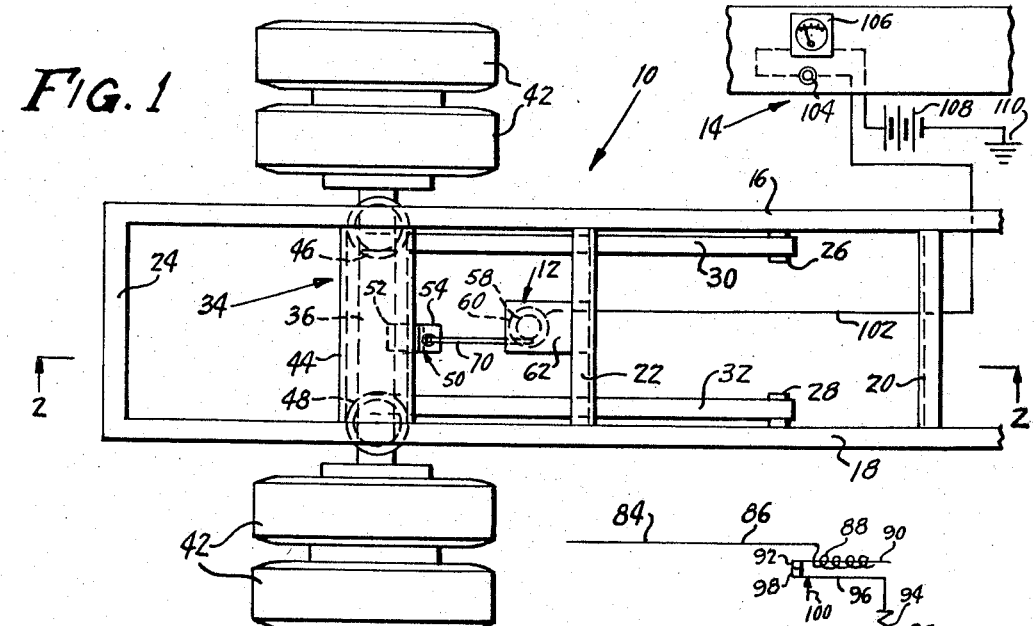
April 18, 1967  L. L. NELSON  3,314,491
LOAD INDICATOR DEVICE
Filed June 28, 1965  2 Sheets-Sheet 1
INVENTOR.
LORING L. NELSON
BY
ATTORNEYS.

3,314,491
LOAD INDICATOR DEVICE
Loring L. Nelson, R.F.D. 1, Salina, Kans. 67401
Filed June 28, 1965, Ser. No. 467,564
9 Claims. (Cl. 177—138)

This invention relates to a load indicator device, and more particularly to a load indicator device mounted on a vehicle to ascertain and indicate the sprung load thereof.

Various attempts have been made by the prior art to provide a load indicating device that will measure the sprung load on a vehicle, but it has been found that the prior art devices are unnecessarily complex and expensive and fail to provide the desired degree of accuracy necessary in such an application.

One object of the instant invention is to provide a load indicator device for any type of sprung vehicle which registers the load placed on such a vehicle at a remote location for ease of observance by an operator.

Another object of the instant invention is to provide a load indicator device which utilizes readily available components in conjunction with a vehicle.

A further object of the instant invention is to provide a load indicator device which is inexpensive to manufacture and install, requires no maintenance, and which has a long period of utility.

Other objects and advantages of the instant invention reside in the combination of elements, arrangements of parts, and features of construction and operation, all as will be more fully pointed out hereinafter and disclosed in the accompanying drawing wherein there is shown a preferred embodiment of this inventive concept.

In the drawings:

FIGURE 1 is a top plan view of a trailer equipped with a load indicating device in accordance with the principles of the instant invention;

FIGURE 2 is a longitudinal cross-sectional view of FIGURE 1 taken along line 2—2 thereof and viewing in the direction of the arrows;

FIGURE 3 is an enlarged view of the load indicator showing the sensing means in operative engagement with the vehicle frame;

FIGURE 4 is a cross-sectional view of the load indicator taken along line 4—4 of FIGURE 3 and viewing in the direction of the arrows;

FIGURE 5 is a schematic view of the electrical circuit of the load indicator.

Figure 6:
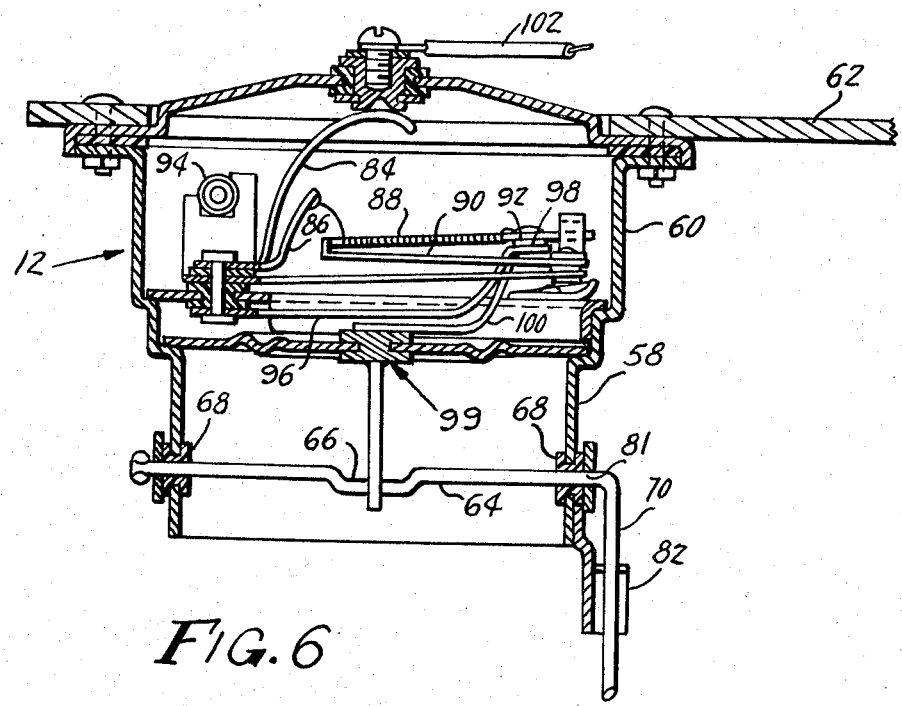
FIGURE 6 is a generalized enlarged vertical cross-sectional view of the load indicator illustrated in FIGURE 4, illustrating the separate components of the indicator in aligned relation for purposes of clarity rather than in skewed relation as shown in FIGURE 4.

Referring now to the drawing in detail, wherein like reference characters designate like elements throughout the several views thereof, there is indicated generally at 10 a trailer equipped with a load indicator shown generally at 12 in operative engagement with an indicator panel shown generally at 14. It should be understood that the application of the load indicator device is not limited to trailers, but may be used with any other form of vehicle, such as a truck or an automobile.

Trailer 10 includes a pair of longitudinal rigid frame members 16, 18 spaced apart by a plurality of transverse braces 20, 22, 24. Trailer 10 also includes a pair of inwardly extending stub axles 26, 28 secured to frame members 16, 18 and a pair of rearwardly extending axle supporting arms 30, 32 rotatably mounted on stub axles 26, 28. Axle supporting arms 30, 32 carry an axle assembly shown generally at 34 which includes a transverse rigid member or axle 36 pivotally secured to arms 30, 32, by a pair of tongues 38 and pivot pins 40. Rotatably mounted on the outer ends of member 36 are a plurality of ground engaging wheels 42 of any conventional type.

Supporting frame members 16, 18 from axle assembly 34 and transverse member 38 is a spring assembly shown generally at 42' including a transverse brace 44 secured to frame member 16, 18 as by welding and a pair of transversely separated springs 46, 48. It will be seen that the positioning of a load on frame members 16, 18, 20, 22, 24 will result in the compression of springs 46, 48 in the known manner. It is the detection of this compression of springs 46, 48 that indicator 12 detects to record a load on indicator panel 14. A rigid platform shown generally at 50 includes a first platform 52 secured to transverse member 38 as by welding and a second vertically spaced platform 54 on which a sensing means shown generally at 56 of indicator 12 is operatively engaged.

Indicator device 12 is nominally a fluid level indicator of the type customarily used to reveal the level of gasoline in a gasoline tank of a vehicle, and is preferably of the type disclosed in United States Patent 2,006,608, the disclosure of which is incorporated herein by reference. Indicator 12 includes a first cylindrical housing 58 and a second coaxial enlarged housing 60 which is secured to cross brace 22 by a plate 62.

An arm 64, which provides a centrally disposed camming surface 66, is pivotally mounted by a pair of horizontally aligned bearings 68 in first housing 58. Horizontal arm 64 is fixedly secured to an L-shaped arm 70 externally of first housing 58 so that the up and down movement of arm 70 causes arm 64 to rotate concurrently therewith.

Pivot arm 70 freely slidingly receives on the free end thereof a threaded screw member 72 which may be adjusted upwardly and downwardly with respect to arm 70 by a first threaded nut 74 positioned above arm 70 and a second threaded nut positioned below arm 70. It may thus be seen that the length of threaded member 72 below pivoted arm 70 may be adjusted by manipulating nuts 74, 76. Since the outer end of pivot arm 70 overlies platform 54, threaded member 72 will contact platform 54 in a free floating unsecured relation such that the contact point of member 72 will slidably move along platform 54 to accommodate pivotal movement of arm 70. The adjustment of the length of threaded member 72 below pivoted arm 70 will result in a change in the electrical circuitry of indicating means 12 as more fully explained hereinafter.

It should thus be apparent that the adjustment means comprising elements 72, 74, 76 allows for the adjustment of the electrical signalling means of the instant invention if and when springs 46 of vehicle 10 become fatigued to the extent that the elevational difference between axle 36 and frame members 16, 18 changes during the progress of time.

A stop means shown generally at 78 includes a substantially triangular member 80 fixedly positioned on load indicator 12 is formed with an aperture 81 through which horizontal arm 64 is rotatably received. Plate 80 includes a pair of lugs 82, one on each side of L-shaped arm 70 to limit the effective pivotal movement thereof.

Another important advantage of pivoted arm 70 and its free floating relation with platform 54 is that arm 70 may be selectively pivoted out of contact with platform 54, as by the actuation of a solenoid appropriately located, to temporarily disengage arm 70 from platform 54. This will allow the disengagement of sensing means 12 during road travel and thus obviate an impact which would damage or deform pivoted arm 70 or the internal mechanisms of sensing means 12 as a result of the movement of arm 70.

Although the major components and general operational features of indicating means 12 will be described, it is to be understood that the disclosure of Patent No. 2,006,608 is relied upon for completeness. Indicator 12 includes an electrical inlet 84 connected to a branch line 86 which is in turn electrically connected to a Nichrome heating filament 88 or the like wrapped about and connected to one arm of a bi-metallic U-shaped thermostat 90 having an electrical contact 92 on one end thereof. One end of a heavy resilient metal member 96 is mounted in load indicator 12 and provides, at the free end thereof, an electrical contact 98 in normal engagement with contact 92. The load indicator circuit is completed by a resistor 94 in series connection with member 96 and a ground connection 95.

Camming surface 66 of horizontal arm 64 is connected through a rod and corrugated metal diaphragm assembly shown generally at 99 to a vertically movable member 100 underlying resilient member 96 for translating the pivotal movement of arm 70 into a corresponding related vertical movement of member 90.

The bi-metallic thermostat 90 is such that, when heated, the free end thereof, on which is mounted electrical connection 92, will be moved upwardly to separate from its normal position in engagement with contacts 98. The input of electrical energy into electrical inlet 84 will complete the circuit including heating filament 88, contacts 92, 98, resistor 94 and ground connection 95. When heating filament 88 warms thermostatic element 90, upward movement of electrical contact 92 will be created thus severing the circuit previously mentioned. The measuring of the electrical flow through inlet 84 will indicate the energy required to separate contacts 92, 98.

The forcible upward movement of metallic member 96 and contacts 98 as will be produced by the clockwise rotation of pivot arm 70 acting through vertically movable member 100 will bias contacts 92, 98 into a position requiring a greater input of electrical energy to separate contacts 92, 98. By measuring this difference in electrical energy input, the deflection of pivoted arm 70 and consequently the weight placed on frame members 16, 18 may be determined as more fully explained hereinafter.

Electrical inlet 84 of road indicator 12 is connected through an electrical wire 102 to indicator panel 14 which includes a circuit closing actuator switch 104 in series connection with a meter 106, which may be of any suitable type, such as is disclosed in Patent No. 2,006,608, a battery 108 and a ground connection 110.

When it is desired to measure a load placed on frame members 16, 18, it is necessary to initially calibrate meter 106 such that the deflection produced on springs 46 by a given load will result in the reading of that load from meter 106. The positioning of an unknown load on frame members 16, 18 will result in the compression of spring 46 by a given amount depending upon the load. The amount of deflection of springs 46 will be equivalent to the change of position of platform 54 and plate 62 as may be seen from FIGURE 2. By measuring this deflection as previously indicated, the weight of the load may be determined.

Since the elastic characteristics of springs 46 may change during a prolonged period of use, recalibration of meter 106 may be necessary. This may conveniently be done by manipulating threaded nuts 74, 76 to minutely alter the inclination of pivot arm 70. Although this would appear to be an arduous and time consuming task, it has been found to be quite simple since the truck operator may calibrate meter 106 when the vehicle is being weighed at a conventional state weighing station as is customarily required.

It is now seen that the load indicator of the instant invention fulfills all of the objects of this invention and others, including many advantages of great practical utility and commercial importance.

Since many embodiments may be made of this instant inventive concept, and since many modifications may be made in the embodiment hereinbefore shown and described, it is to be understood that the foregoing is to be interpreted merely as illustrative and not in a limiting sense.

I claim:
1. In combination
   a load carrying vehicle providing a load receiving area, a plurality of ground supporting tractive means mounted on an axle, and a spring means interconnecting said axle and said frame in supporting relation and
   a load indicating means including
      load indicator means mounted on said vehicle having sensing means to measure the deflection of said spring means when a load is placed on said load receiving area, said sensing means including an arm pivotally mounted on said load indicator means having a free end in operative free floating engagement with said axle and electrical means for translating the angular deflection of said arm into indicia representative of the weight of said load causing said deflection, said free end of said arm being in bearing weight supported relation with said axle.

2. The structure of claim 1 wherein said pivoted arm includes means adjacent the free end thereof for selectively adjustably fixing the angular relationship of said arm with respect to said axle when the vehicle is loaded with a predetermined weight for calibrating said electrical means.

3. The structure of claim 2 wherein said adjustment means includes a threaded member.

4. The structure of claim 3 wherein said threaded member is freely slidably mounted on said pivoted arm and said adjustment means includes a first threaded nut received on said threaded member between said pivoted arm and said axle and a second threaded nut received in said threaded member such that said pivoted arm resides between said threaded nuts.

5. The structure of claim 1 wherein said electrical means includes a bi-metallic thermostat member having a heating filament, an electrical contact in normal engagement with said bi-metallic member and means operatively connected with said pivoted arm for transmitting the pivoted movement of said arm against said electrical contact to increase the forces holding said bi-metallic member and said electrical contact in engagement.

6. In combination, a vehicle and a load indicating device comprising
   a vehicle having ground engaging support means, means mounting said ground support means, rigid frame means, and means resiliently supporting said frame means on said mounting means and
   a load indicator including translating means mounted on said frame including an electrical circuit means for changing mechanical movement into an electrical signal proportional to said mechanical movement and sensing means including an arm having one end pivotally mounted in said translating means in operative engagement with said electrical circuit means for transmitting a mechanical movement to said translating means, said sensing arm having a free end being in free floating bearing weight supported relation with said means mounting said ground engaging support means for detecting relative movement between said frame means and said means mounting said ground engaging support means.

7. The structure of claim 6 including adjustable means on said free end of said sensing arm for changing the inclination of said arm with respect to said mounting means.

8. The structure of claim 7 wherein said adjustable means includes a threaded member.

9. The structure of claim 7 wherein said adjustable means includes a threaded member slidingly mounted on said free end of said sensing arm in perpendicular relation with said mounting means, a first nut threadably received on said threaded member between said arm and said mounting means and a second nut threadably received on said threaded member on the side of said arm away from said first nut so that said nuts straddle said sensing arm.

References Cited by the Examiner

UNITED STATES PATENTS

| | | | |
|---|---|---|---|
| 39,628 | 8/1863 | Brinckerhoff | 74—586 |
| 649,919 | 5/1900 | Driggs | 177—138 |
| 2,006,608 | 7/1935 | Smulski | 73—313 |
| 3,151,692 | 10/1962 | Dysart | 177—138 |

RICHARD B. WILKINSON, *Primary Examiner.*

G. H. MILLER, JR., *Assistant Examiner.*